Patented May 12, 1942

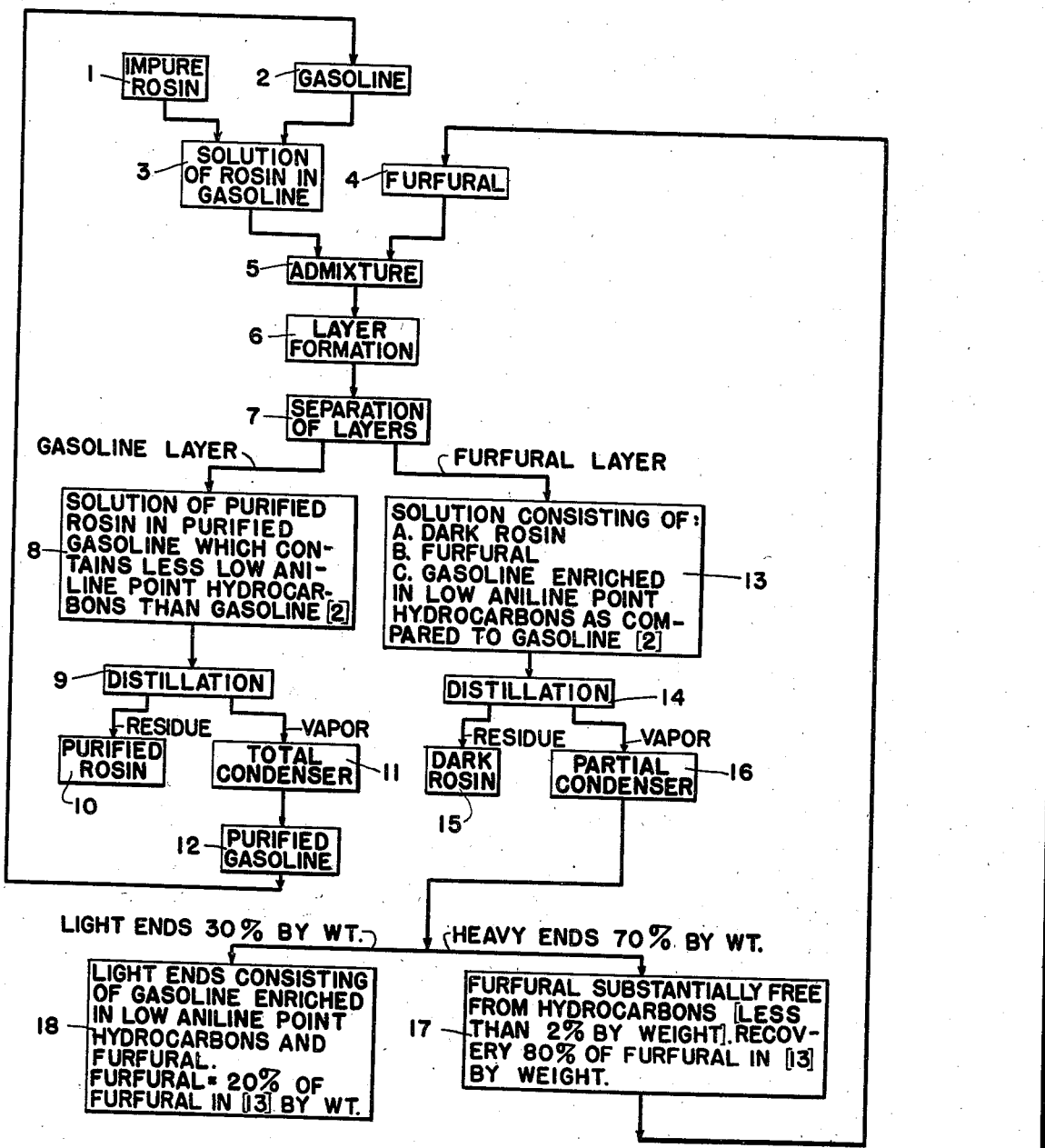

2,283,156

UNITED STATES PATENT OFFICE 2,283,156

REFINING PROCESS

Robert W. Martin, Wilmington, Del.

Application October 10, 1940, Serial No. 360,552

8 Claims. (Cl. 260—107)

This invention relates to the selective solvent refining of rosin and rosin derivatives and, more particularly, to an improved process of selective solvent refining rosin and rosin derivatives whereby a greater improvement in the color is effected or whereby a given improvement in color is brought about more effectively or more economically.

Heretofore, selective solvent refining of rosin and the like has been carried out by dissolving the rosin in a suitable volatile organic solvent such as gasoline, intimately contacting the solution with a selective solvent for color bodies in the rosin which is preferably substantially immiscible with the solution, allowing layer separation to take place, and separating the extract layer from the raffinate layer. The extract was then evaporated to remove the volatile material therefrom and leave as a residue the rosin color bodies in the form of dark rosin. The entire volatile portion so evaporated was condensed and recycled to the extraction zone where it was utilized for carrying out the extraction step.

A typical example of selective solvent refining of rosin is the process described in the U. S. Patents to Kaiser et al., 1,715,085 and 1,715,088, wherein a solution of rosin in gasoline is extracted with furfural which removes the rosin color bodies and leaves a solution of purified rosin in gasoline. The removed furfural extract is then evaporated to leave a residue of the rosin color bodies in the form of very dark colored rosin. The entire volatile portion so evaporated is condensed without fractionation, and the condensate recycled to the extraction zone where it is utilized for carrying out a subsequent extraction.

In practice, the condensed furfural obtained by condensation of the entire distillate from the evaporation of the extract contains hydrocarbons dissolved from the gasoline by the furfural. These hydrocarbons are present in sufficient amount to saturate the furfural, and frequently in addition they separate out from the condensed furfural phase as an additional phase. This additional phase is separated from the furfural phase and recycled in conjunction with the gasoline recovered by evaporation of the raffinate layer to recover the purified rosin. The furfural phase saturated with hydrocarbons in also recycled for use in further extraction.

I have discovered that the hydrocarbon mixture which is present in the distillate from the evaporation of the extract is radically different in composition from the original gasoline or from the gasoline recovered upon evaporation of the raffinate and has an entirely different influence on the selective solvent refining operation, upon being re-introduced into the extraction zone. These hydrocarbons are extracted from the original gasoline by the selective solvent and if reintroduced into the system, markedly reduce the refining efficiency. The selective solvent for the color bodies in the rosin is also a selective solvent for these hydrocarbons in the presence of the paraffin hydrocarbons which may constitute the major components of the original gasoline.

I have further discovered that the refining action is greatly improved if, instead of recycling the entire distillate from the evaporation of the extract, this distillate is fractionated to resolve it into a fraction of substantially pure selective solvent and this fraction of pure selective solvent recycled. The distillate from the evaporation of the extract contains substantial quantities of certain hydrocarbons apparently derived from the gasoline which interfere materially with the refining action of the furfural on the rosin. By separating these hydrocarbons from the selective solvent by suitable treatment of the extract, materially improved refining results are obtained.

These objectionable hydrocarbons comprise chiefly aromatic hydrocarbons, such as toluene and the xylenes, in admixture with naphthene hydrocarbons. Such hydrocarbons are characterized by having a low aniline point. The aniline point of a hydrocarbon is the temperature in degrees centigrade at which equal volumes of the hydrocarbon and aniline become miscible. Thus, the various hydrocarbons have the aniline point indicated in the following table:

| Hydrocarbon | Aniline point-°C. |
|---|---|
| | °C |
| Toluene | −30 |
| Xylenes | −20 |
| Cyclopentane | 18 |
| Cyclohexane | 31 |
| Hexane | 69 |
| Heptane | 70 |
| Octane | 72 |

An object of the present invention is to provide for intermittently or continuously removing these objectionable low-aniline point hydrocarbons from the system.

The principal object of the present invention, therefore, is to provide an improved process for the refining of rosin or the like, wherein the distillate from the extract is treated so as to separate substantially pure selective solvent therefrom.

Other objects will more fully hereinafter appear.

In the accompanying drawing, the figure is a flow sheet diagram of a typical process of selective solvent refining of rosin in accordance with the present invention.

In accordance with the present invention, the foregoing objects are accomplished by treating the extract in such manner as to recover from it substantially pure selective solvent which is substantially free from the objectionable low-aniline point hydrocarbons. It has been found that the aromatic hydrocarbons and naphthene hydrocarbons may be readily separated from the selective solvent. Preferably, pure selective solvent so recovered is recycled and is utilized for extracting the original gasoline solution of rosin or the like. In this way, the process of extraction may be carried out in the presence of a minimum of such objectionable hydrocarbons.

My invention is in part based upon the observation that low aniline point hydrocarbons exert a deleterious effect when present in substantial proportions in the extraction zone. They exhibit a marked solvent action on the color bodies of the rosin or the like, thereby preventing the selective solvent from extracting the color bodies to the desired extent. Another disadvantage of the presence of low aniline point hydrocarbons in the extraction zone is that their high solubility in the selective solvent causes the selective solvent layer to have a lower average density than it would if the gasoline were composed of high aniline point (and therefore less soluble in the selective solvent layer) hydrocarbons, which makes very difficult the gravity separation of the extract phase from the raffinate phase. In addition, the selective solvent exerts a selective solvent action on such low aniline point hydrocarbons thereby lessening its capacity for exerting a selective solvent action on the color bodies of the rosin or the like.

My invention takes advantage of the fact that these objectionable low-aniline point hydrocarbons are selectively dissolved by the selective solvent used and thus are concentrated in the extract. If, then, this extract be evaporated and the distillate be fractionated so as to separate a fraction of pure selective solvent from the low-aniline point hydrocarbons, and this pure selective solvent fraction be recycled, there is effected the removal of the objectionable low-aniline point hydrocarbons from the system. At the same time, there is made available a hydrocarbon fraction consisting essentially of such low aniline point hydrocarbons, namely the aromatic hydrocarbons and the naphthene constituents originally introduced by the gasoline, which may advantageously be employed for blending with ordinary gasoline or gasoline deficient in such constituents in order to improve its anti-knock characteristic as motor fuel.

In the prior art processes, there was recycled the entire distillate from evaporation of the extract which distillate embodied the selective solvent and the objectionable low-aniline point hydrocarbons, and thereby these low-aniline point hydrocarbons were continuously maintained in the system with continuous deleterious effects upon the refining action. On the other hand, in accordance with the present invention, the selective solvent which is recycled is substantially free from such objectionable hydrocarbons. In this way, the efficiency of the refining action is greatly enhanced.

In accordance with the present invention, low aniline point hydrocarbons are continuously removed from the extraction zone, whereas in the prior art processes referred to above, these low aniline point hydrocarbons continuously accumulate in the system by reason of the continuous recycling of the extract condensate containing them. As will be understood, the ordinary gasoline continuously introduced in small amounts in order to make up for system losses carries substantial amounts of such low aniline point hydrocarbons, and therefore, in the prior art processes, such low aniline point hydrocarbon continued to increase in concentration until the refining action was reduced in efficiency to an uneconomic point, whereupon it was necessary to clean out the system as by bleeding off of gasoline and selective solvent and replacing with fresh materials which was expensive and inconvenient. These disadvantages resulted from the fact that low aniline point hydrocarbons are deleterious in the selective solvent refining of rosin and the like, and that furfural selectively dissolves such low aniline point hydrocarbons whereby they were continuously reintroduced into the extraction zone.

As the selective solvent, there may be used any selective solvent which exerts a selective solvent action on both the color bodies in the rosin or the like and on the low aniline point hydrocarbons in gasoline. Examples of suitable selective solvents are; aldehydes such as furfural, benzaldehyde, etc., nitrobenzene (especially with the higher boiling hydrocarbon solvents) phenols such as phenol (preferably in admixture with water, comprising about 85 to 90% phenol) resorcinol, cresol, etc., ethylene chlorohydrin, which can be either anhydrous or containing up to 30% water, furfuryl alcohol, aniline, alkyl ethers of ethylene glycol such as monomethyl ether of ethylene glycol, etc.; esters such as phenol acetate, benzyl acetate, methyl furoate, isopropyl furoate, methyl acetate, resorcinol monoacetate, resorcinol diacetate; acids such as acetic acid, propionic acid, etc., dichloroethyl ether, liquid sulfur dioxide, etc. Of the foregoing, furfural is preferred.

Any type of rosin may be treated by the process of the present invention such as wood rosin, gum rosin, heat treated rosin, isomerized rosin, or the purified acids which are present in rosin such as commercial abietic acid, pure abietic acid, pimaric acid, sapinic acid, etc. Instead of rosin, rosin derivatives may be refined such as rosin esters, for example, ester gum and the esters of rosin with methanol, ethanol, propanol, butanol, amyl alcohol, cetyl alcohol, lauryl alcohol, stearyl alcohol, furfuryl alcohol, hydrofurfuryl alcohol, abietanol, phenol, benzyl alcohol, etc.; polyhydric alcohols such as ethylene glycol, diethylene glycol, triethylene glycol, glycerol, sorbitol, mannitol, erythritol, pentaerythritol, etc., or modified rosin such as hydrogenated rosin, rosin subjected to hydrogenating catalysts and conditions without hydrogen being added, polymerized rosin, and esters of such modified rosins.

As the solvent in which the impure rosin or the like to be refined is dissolved, I employ a light mobile petroleum distillate which is capable of yielding a rosin solution of high concentration but of low viscosity. In general, the petroleum distillate may be any light petroleum distillate having a boiling range not above that of kerosene. Thus, I may use petroleum ether (boiling range 40–60° C.), gasoline (boiling range 60°–120° C.), petroleum spirit (boiling range 80°–130° C.), V. M. & P. naphtha (boiling range 100–160° C.), mineral spirit (90% below 200° C.), kerosene (boiling range 150°–270° C.), Stoddard Solvent (at least 50% below 350° F. or 177° C. and end point not higher than 410° F. or 210° C.). I may use gasoline which is suitable for use in spark-fired internal combustion motors which has an initial boiling point of from about 70° F. (21° C.) to about 140° F. (60° C.), an end boiling point of from about 350° F. (177° C.) to about 450° F. (232° C.) and a gravity of from about 45° Bé. to about 65 Bé. Or I may use gasoline having an initial boiling point of 200° F. (93° C.) which is unsuitable for use as motor fuel. I prefer to use a petroleum distillate capable of being separated from the selective solvent by fractional distillation. It is further preferred to use a solvent having a maximum boiling point of about 200° C. Thus, where furfural is used as the selective solvent, allowing a range of 155° to 165° C. for the furfural, I prefer to use a petroleum distillate boiling below 155° C. or between 165° C. and about 200° C. Usually a distillate boiling below the range of furfural will be preferred.

The selective solvent may be contacted with the rosin solution in any desired manner, for example by heating the mixture to a temperature above the point of miscibility followed by cooling to effect immiscibility, vigorous agitation of the two immiscible phases, concurrent or countercurrent flow through one or a plurality of washing towers which may contain suitable packing as Raschig rings, perforated plates or other contacting media, single batch extraction, multiple batch extraction, batch or step counterflow, continuous counterflow, etc. Thereafter, the extract in which the rosin color bodies and low aniline point hydrocarbons are concentrated may be separated from the raffinate for example by gravity separation and decantation, or by centrifuging, carried out either in the equipment in which extraction was carried out or apart therefrom.

The extract is now evaporated to leave as a residue the color bodies. The vapors are fractionated in any suitable manner to effect resolution into a cut of the pure selective solvent substantially free from hydrocarbons and another cut of the hydrocarbons dissolved in the solvent and rich in low aniline point hydrocarbons. If desired, the latter cut may be fractionated into cuts of pure toluene, xylenes, naphthenes, etc. The cut of pure selective solvent is recycled for use in further extraction.

The raffinate may be evaporated to leave a residue of refined rosin. The distillate may be condensed and the purified gasoline so formed recycled for use in forming a fresh solution of impure rosin to be refined. If desired, the distillate may be fractionated to separate the petroleum hydrocarbons from a fraction of pure selective solvent which was dissolved by the gasoline layer, this fraction of pure solvent being recycled to the extraction zone. Whether the purified gasoline is freed from such dissolved solvent or not, such gasoline or such solvent may be recycled without objectionable results because the small amount of selective solvent which is dissolved in the gasoline layer will carry only an exceedingly small amount of low aniline point hydrocarbons. Moreover, such low aniline hydrocarbons are ultimately recovered in the extract after the present invention has been applied to the system for an extended period of time.

The present invention may be more fully understood by reference to the accompanying drawing which portrays a typical rosin refining process carried out in accordance with the principles of the present invention. In this process, the impure rosin is first dissolved in ordinary commercial gasoline, (block 3) containing substantial amounts of low aniline point hydrocarbons, whereupon the solution is extracted with furfural in any desired manner as, for example, by admixing furfural with the gasoline solution, allowing layer formation to take place and separating the furfural layer from the gasoline layer. This causes the furfural to extract not only the color bodies derived from the rosin, but the low aniline point hydrocarbons derived from the original gasoline.

The gasoline layer containing the dissolved purified rosin may then be treated in any desired manner to separate the purified rosin from the purified gasoline as, for example, by distilling the solution in any desired manner. This yields a residue of highly purified rosin (block 10) while the vapors, when condensed, yield purified gasoline (block 12) substantially free from low aniline point hydrocarbons.

It is preferred to recycle the thus recovered purified gasoline from block 12 to block 2, utilizing it as the solvent for forming the initial solution of impure rosin in gasoline. In order to make up for system losses which inevitably occur, the purified gasoline may be blended with a small amount of ordinary commercial gasoline of the type heretofore employed. In this way, the system is kept substantially free at all times from the introduction of material amounts of gasoline containing low aniline point hydrocarbons, and in this way, the presence of more than a trace of low aniline point hydrocarbons during the extraction process is prevented.

The furfural layer is a solution consisting essentially of the color bodies derived from the original rosin, furfural, and gasoline rich in low aniline point hydrocarbons. This furfural layer may be treated in any manner to recover therefrom the furfural in substantially pure form virtually free from low aniline point hydrocarbons. For example, the furfural layer may be subjected to distillation which yields as the residue the rosin color bodies (block 15). The vapors obtained by this distillation comprise furfural and gasoline rich in low aniline point hydrocarbons, and may be separated and processed in any desired manner amoung which are; (1) The vapors may be introduced into a suitable fractionating column at the proper point. From the bottom of the column is obtained substantially pure furfural. From the top of the column is obtained low aniline point gasoline and a minor amount of furfural. (2) The vapors may be fractionally condensed and the remaining vapors introduced into a fractionating column. From the fractional condenser and the bottom of the fractionating column, there is obtained substantially pure furfural. From the top of the fractionating column, there is obtained low aniline point gasoline and a minor amount of furfural. (3) The vapors may be fractionally condensed and the remaining vapors introduced into a total condenser. From the fractional condenser is obtained a substantially pure furfural. The condensate from the total condenser is then further processed as for example by batch distillation and water washing to recover the furfural and low aniline point hydrocarbons contained therein. This is a preferred method of operation.

The low aniline point gasoline comprises chiefly aromatic hydrocarbons, such as xylenes and toluene, and naphthene hydrocarbons, all derived from the original gasoline. This fraction may be blended with gasoline deficient in aromatic and naphthene constituents so as to increase its anti-knock characteristics, or may be utilized in any other desired manner. For example, it may be subjected to fractional distillation so as to recover separate fractions of toluene, xylenes, naphthenes, etc.

The furfural recovered in the foregoing manner (block 17) and which is substantially free from hydrocarbons is recycled in the process (from block 17 to block 4) being employed as the selective solvent in a repetition of the process. In order to make up for system losses of furfural, the recycled furfural may, if desired, be blended with a small amount of fresh furfural such as the ordinary furfural of commerce, this blend being utilized as the extraction agent.

As a specific example, I may dissolve impure rosin (block 1) in a gasoline (block 2) having an aniline point of 55° C. to form a solution containing 15 pounds of rosin to 85 pounds of gasoline. This gasoline solution is then contacted with furfural for example in a tower equipped with wire screen plates and suitable accessories and the furfural layer separated by gravity and removed from the bottom of the tower and the gasoline layer separated by gravity and removed from the top of the tower. The relative amounts of gasoline solution of rosin and furfural are 11 pounds by weight of furfural per hundred pounds by weight of gasoline solution of rosin. The gasoline and rosin are recovered as shown in the drawing. The recovered gasoline when freed of the small amount of furfural which accompanies it, will be found to have an aniline point in excess of 55° C., and the aniline point of the gasoline recovered in this manner will be improved by each passage through the cycle until some limiting value is attained in excess of 60° C.

The furfural layer is distilled and the vapors fractionally condensed into light and heavy fractions. The ratio of light and heavy fractions is determined by the conditions in the fractional condenser and may vary between wide limits. For example, the fractional condensation may be continued in such a manner as to divide the vapors into 70% by weight of heavy ends and 30% by weight of light ends (blocks 17 and 18). The heavy ends will consist of substantially pure furfural which may suitably and advantageously be re-used in the rosin refining cycle. The light ends consist of a mixture of furfural and low aniline point hydrocarbons. Under the conditions described, these hydrocarbons when isolated will be found to have an aniline point of about 21° C. The light ends may be processed by distillation and water washing to recover as pure furfural all of the furfural which they contain and to concurrently recover the low aniline point hydrocarbons. These low aniline point hydrocarbons or gasolines are superior to ordinary gasoline for many industrial purposes.

Instead of fractional distillation or fractional condensation or a combination of both for separating from the extract the selective solvent in pure form substantially free from low aniline point hydrocarbons, water separation may be effected where the selective solvent is miscible with water. Thus, where furfural is used as the selective solvent, the extract or the total condensate of the vapors produced by evaporation thereof may be commingled with water at ordinary temperature, whereupon the hydrocarbons form a layer floating upon the furfural-water layer. The amount of water should be such as to effect ready and substantially complete separation of the furfural from the hydrocarbons. These layers are separated and the furfural layer is concentrated by evaporation of water to yield concentrated or pure furfural free from hydrocarbons and adapted to be re-cycled for carrying out the extraction step. In this way an even sharper separation of the selective solvent from the gasoline rich in non-paraffins can be effected.

Thus, in a typical continuous operation where distillation or evaporation of the furfural layer (the extract) is carried out in block 14 by means of steam, 93 parts by weight per minute of distillate from the evaporation in block 14 are passed to a hot condenser maintained at a temperature of about 150° C. (below the boiling point of furfural but above the boiling points of any hydrocarbons present and of water), 65 parts by weight per minute of furfural (block 17) containing about 2% or less of hydrocarbons are condensed in this hot condenser and 28 parts by weight per minute pass through the hot condenser to the cold condenser maintained at about 20° C., and are condensed therein. This 28 parts by weight per minute of cold condensate continuously separates into three layers—7.0 parts by weight per minute of gasoline (high in aromatics) which can be redistilled for the elimination of aromatics; 3.5 parts by weight per minute of water which contains dissolved furfural up to the limit of its solubility and which may be passed to a still for recovery of this dissolved furfural; and 17.5 parts by weight per minute of furfural containing about 2% of aromatics and other low aniline point hydrocarbons dissolved therein and which may be water washed to separate the aromatic gasoline from the furfural. The 65 parts by weight per minute of hot condensate may also be water washed to separate the aromatic gasoline from the furfural. The 65 parts by weight per minute of hot condensate may also be water washed to separate dissolved hydrocarbons from the furfural, although this is not essential. All of the furfural recovered as above is re-cycled for further extraction.

Instead of dissolving the impure rosin to be purified in the gasoline in advance, followed by selective solvent refining of the resulting solution with a selective solvent, the process may be carried out by adding the crude rosin to a mixture of the gasoline and selective solvent. This mixture may be at a temperature high enough to effect miscibility of the gasoline and solvent, or below the temperature of miscibility. Preferably, the mixture of rosin, gasoline, and solvent is heated to miscibility temperature followed by cooling it therebelow to aid separation. For example, the molten impure rosin may be added to a mixture of gasoline and furfural, or the molten rosin, gasoline, and furfural may be brought simultaneously into contact with one another under such conditions that a miscible solution at a minimum temperature of about 250° F. results, after which this mixture is cooled to bring about immiscibility.

By carrying out the refining of rosin and rosin esters in accordance with the invention, numerous advantages are attained. An important advantage is that the refining process is continuously carried out in the presence of a continually diminishing quantity of low aniline point hydrocarbons. In this way, a higher grade of rosin or rosin ester is obtained in a shorter time and more efficiently. The process is additionally advantageous because it yields a continuous supply of low aniline point gasoline which may advantageously be utilized for blending with ordinary gasoline or gasoline deficient in low aniline point hydrocarbons in order to yield an improved motor fuel.

In this specification and in the claims appended hereto, the term "low aniline point hydrocarbons" is used to designate those hydrocarbons having an aniline point below about 50° C.

It is to be understood that the details and examples hereinbefore set forth are illustrative only and that the invention as broadly described and claimed is in no way limited thereby.

What I claim and desire to protect by Letters Patent is:

1. The process of refining a material selected from the group consisting of rosin, modified rosin, and esters of rosin and modified rosin, which comprises subjecting said material dissolved in a light petroleum distillate which is liquid at ordinary temperature containing hydrocarbons having an aniline point below about 50° C. to treatment with a selective solvent for color bodies in said material and for hydrocarbons having an aniline point below about 50° C., said selective solvent being capable of immiscibility with the said light petroleum distillate solution, separating the resulting immiscible solutions comprising an extract phase containing said selective solvent together with said color bodies and substantially all of said hydrocarbons having an aniline point below about 50° C. contained in the said light petroleum distillate, and a raffinate phase containing the refined material dissolved in the light petroleum distillate substantially free from the hydrocarbons having an aniline point below about 50° C. originally contained therein, resolving said extract phase into a fraction of pure selective solvent substantially free of color bodies and said hydrocarbons having an aniline point below about 50° C. and into at least one other fraction containing the said low aniline point hydrocarbons, recycling said recovered fraction of pure selective solvent for carrying out the extraction treatment of additional solution of said material in a light petroleum distillate containing hydrocarbons having an aniline point below about 50° C.

2. The process of refining a material selected from the group consisting of rosin, modified rosin, and esters of rosin and modified rosin, which comprises subjecting said material dissolved in a light petroleum distillate which is liquid at ordinary temperature containing hydrocarbons having an aniline point below about 50° C. to treatment with a selective solvent for color bodies in said material and for hydrocarbons having an aniline point below about 50° C., said selective solvent being capable of immiscibility with the said light petroleum distillate solution, separating the resulting immiscible solution comprising an extract phase containing said selective solvent together with said color bodies and substantially all of said hydrocarbons having an aniline point below about 50° C. contained in the said light petroleum distillate, and a raffinate phase containing the refined material dissolved in the light petroleum distillate substantially free from the hydrocarbons having an aniline point below about 50° C. originally contained therein, evaporating the volatile portion of the extract, fractionating the vapors so obtained into one fraction of pure selective solvent substantially free from color bodies and from said hydrocarbons having an aniline point below about 50° C. and at least one other fraction comprising said hydrocarbons having an aniline point below about 50° C., and recycling the pure selective solvent substantially free from said hydrocarbons having an aniline point below about 50 C. thereby maintaining the content of said hydrocarbons not above the content of said hydrocarbons in the fresh petroleum distillate admitted to the system.

3. The process of refining a material selected from the group consisting of rosin, modified rosin, and esters of rosin and modified rosin, which comprises subjecting said material dissolved in a light petroleum distillate which is liquid at ordinary temperature containing hydrocarbons having an aniline point below about 50° C. to treatment with a selective solvent for color bodies in said material and for hydrocarbons having an aniline point below about 50° C., said selective solvent being capable of immiscibility with the said light petroleum distillate solution, separating the resulting immiscible solutions comprising an extract phase containing said selective solvent together with said color bodies and substantially all of said hydrocarbons having an aniline point below about 50° C. contained in the said light petroleum distillate, and a raffinate phase containing the refined material dissolved in the light petroleum distillate substantially free from the hydrocarbons having an aniline point below about 50° C. originally contained therein, resolving said extract phase into a fraction of pure selective solvent substantially free of color bodies and said hydrocarbons having an aniline point below about 50° C. and into at least one other fraction containing the said low aniline point hydrocarbons, removing from the system said fraction comprising said hydrocarbons having an aniline point below about 50° C., recycling said recovered fraction of pure selective solvent for carrying out the extraction treatment, evaporating the raffinate to recover therefrom the refined material and the light petroleum distillate substantially free from the hydrocarbons having an aniline point below about 50° C., and recycling the said purified light petroleum distillate together with light petroleum distillate containing hydrocarbons having an aniline point below about 50° C. to form a solution of the material selected from the said group in a repetition of the foregoing steps.

4. The process of refining a material selected from the group consisting of rosin, modified rosin, and esters of rosin and modified rosin, which comprises subjecting said material dissolved in gasoline containing hydrocarbons having an aniline point below about 50° C. to extraction treatment with furfural, said furfural being a selective solvent for color bodies in said material and for hydrocarbons having an aniline point below about 50° C., said furfural being capable of immiscibility with the said gasoline solution, separating the resulting immiscible solutions comprising an extract phase containing said furfural, color bodies derived from said material, and substantially all of said hydrocarbons having an aniline point below about 50° C., and a raffinate phase containing the refined material and said gasoline and being substantially free from color bodies and from said hydrocarbons having an aniline point below about 50° C., resolving said extract phase into a fraction of pure furfural substantially free from color bodies and from hydrocarbons having an aniline point below about 50° C. and at least one other fraction comprising said hydrocarbons having an aniline point below about 50° C. and recycling the pure furfural substantially free from said hydrocarbons having an aniline point below about 50° C. thereby maintaining the content of said hydrocarbons not above the content of fresh gasoline admitted to the system.

5. The process of refining a material selected from the group consisting of rosin, modified rosin, and esters of rosin and modified rosin, which comprises subjecting said material dissolved in gasoline containing hydrocarbons having an aniline point below about 50° C. to extracting treatment with furfural, said furfural being a selective solvent for color bodies in said material and for hydrocarbons having an aniline point below about 50° C., said furfural being capable of immiscibility with the said gasoline solution, separating the resulting immiscible solutions comprising an extract phase containing said furfural together with said color bodies and substantially all of said hydrocarbons having an aniline point below about 50° C. contained in the said gasoline, and a raffinate phase containing the refined material dissolved in the gasoline substantially free from the hydrocarbons having an aniline point below about 50° C. originally contained therein, resolving said extract phase into a fraction of pure furfural substantially free from color bodies and from said hydrocarbons having an aniline point below about 50° C. and at least one other fraction comprising said hydrocarbons having an aniline point below about 50° C., recycling said fraction of pure furfural, evaporating the raffinate to recover therefrom gasoline which is substantially free from hydrocarbons having an aniline point below about 50° C., recycling the thus recovered gasoline and employing it together with additional gasoline which contains substantial amounts of hydrocarbons having an aniline point below about 50° C. to form a solution of material selected from said group in a repetition of the foregoing steps.

6. The continuous process of refining a material selected from the group consisting of rosin, modified rosin, and esters of rosin and modified rosin, which comprises subjecting said material dissolved in gasoline containing hydrocarbons having an aniline point below about 50° C. to extracting treatment with furfural, said furfural being a selective solvent for color bodies in said material and for hydrocarbons having an aniline point below about 50° C., said furfural also being capable of immiscibility with the said gasoline solution, separating the resulting immiscible solutions comprising an extract phase containing said furfural together with said color bodies and substantially all of said hydrocarbons having an aniline point below about 50° C. contained in the said gasoline, evaporating the volatile portion of the extract phase, effecting fractionation of the vapors so obtained into one fraction of pure furfural substantially free from said color bodies and from said hydrocarbons having an aniline point below about 50° C., and at least one other fraction comprising said hydrocarbons having an aniline point below about 50° C., recycling said fraction of pure furfural, evaporating the raffinate to recover therefrom gasoline which is substantially free from said hydrocarbons having an aniline point below about 50° C., recycling the thus recovered gasoline and employing the recovered gasoline together with some additional gasoline containing appreciable amounts of hydrocarbons having an aniline point below about 50° C. for said first-mentioned solution step.

7. The process of refining a material selected from the group consisting of rosin, modified rosin, and esters of rosin and modified rosin, which comprises subjecting said material dissolved in gasoline containing hydrocarbons having an aniline point below about 50° C. to extracting treatment with furfural, said furfural being a selective solvent for color bodies in said material and for hydrocarbons having an aniline point below about 50° C., said furfural also being capable of immiscibility with the said gasoline solution, separating the resulting immiscible solutions comprising an extract phase containing said furfural together with said color bodies and substantially all of said hydrocarbons having an aniline point below about 50° C. contained in the said gasoline, and a raffinate phase containing the refined material dissolved in the gasoline substantially free from the color bodies and from hydrocarbons having an aniline point below about 50° C., commingling with water a liquid containing said furfural and said hydrocarbons having an aniline point below about 50° C. present in the extract phase to form an aqueous phase containing said furfural free from said hydrocarbons and a water-immiscible phase containing said hydrocarbons, separating said phases, concentrating said aqueous phase by evaporation of the water therefrom to obtain pure furfural substantially free from hydrocarbons and color bodies and recycling the pure recovered furfural substantially free from said hydrocarbons having an aniline point below about 50° C., thereby maintaining the content of said hydrocarbons not above the hydrocarbon content of fresh gasoline admitted to the system.

8. The continuous process of refining a material selected from the group consisting of rosin, modified rosin, and esters of rosin and modified rosin, which comprises subjecting said material dissolved in gasoline containing hydrocarbons having an aniline point below about 50° C. to extracting treatment with furfural, said furfural being a selective solvent for color bodies in said material and for hydrocarbons having an aniline point below about 50° C., said furfural also being capable of immiscibility with the said gasoline solution, separating the resulting immiscible solutions comprising an extract phase containing said furfural together with said color bodies and substantially all of said hydrocarbons having an aniline point below about 50° C. contained in the said gasoline, and a raffinate phase containing the refined material dissolved in the gasoline substantially free from the hydrocarbons having an aniline point below about 50° C. originally contained therein, evaporating the volatile portion from the extract phase, effecting fractionation of the vapors so obtained into approximately a 70% fraction of heavy ends comprising pure furfural substantially free from color bodies and from said hydrocarbons having an aniline point below about 50° C., and approximately a 30% fraction of light ends comprising a mixture of furfural and said hydrocarbons having an aniline point below about 50° C., recycling said fraction of pure furfural, evaporating the raffinate phase to thereby recover gasoline which is substantially free from said hydrocarbons having an aniline point below about 50° C., recycling the thus recovered gasoline and employing the recovered gasoline together with some additional gasoline containing appreciable amounts of hydrocarbons having an aniline point below about 50° C. for said first-mentioned solution step.

ROBERT W. MARTIN.